(No Model.)  2 Sheets—Sheet 1.
W. H. BROCK.
Sheet-Metal Can Machinery.
No. 232,111.  Patented Sept. 14, 1880.
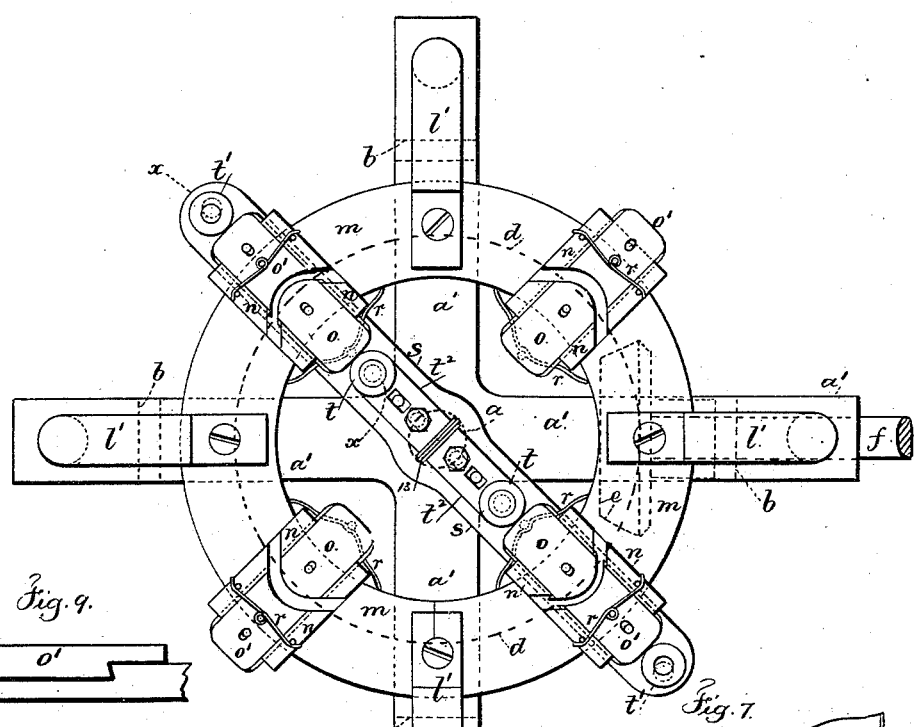
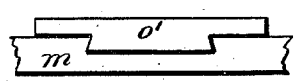
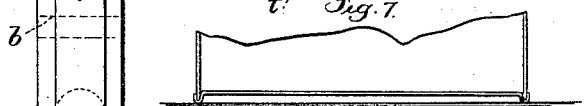
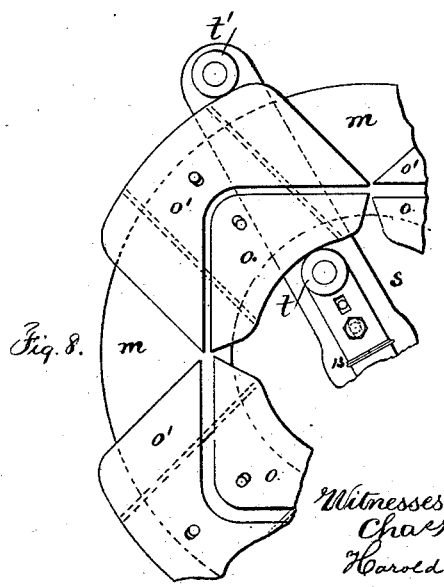
Witnesses
Chas. H. Smith
Harold Serrell
Inventor
William H. Brock
per Lemuel W. Serrell
atty (No Model.) 2 Sheets—Sheet 2.
W. H. BROCK.
Sheet-Metal Can Machinery.
No. 232,111. Patented Sept. 14, 1880.
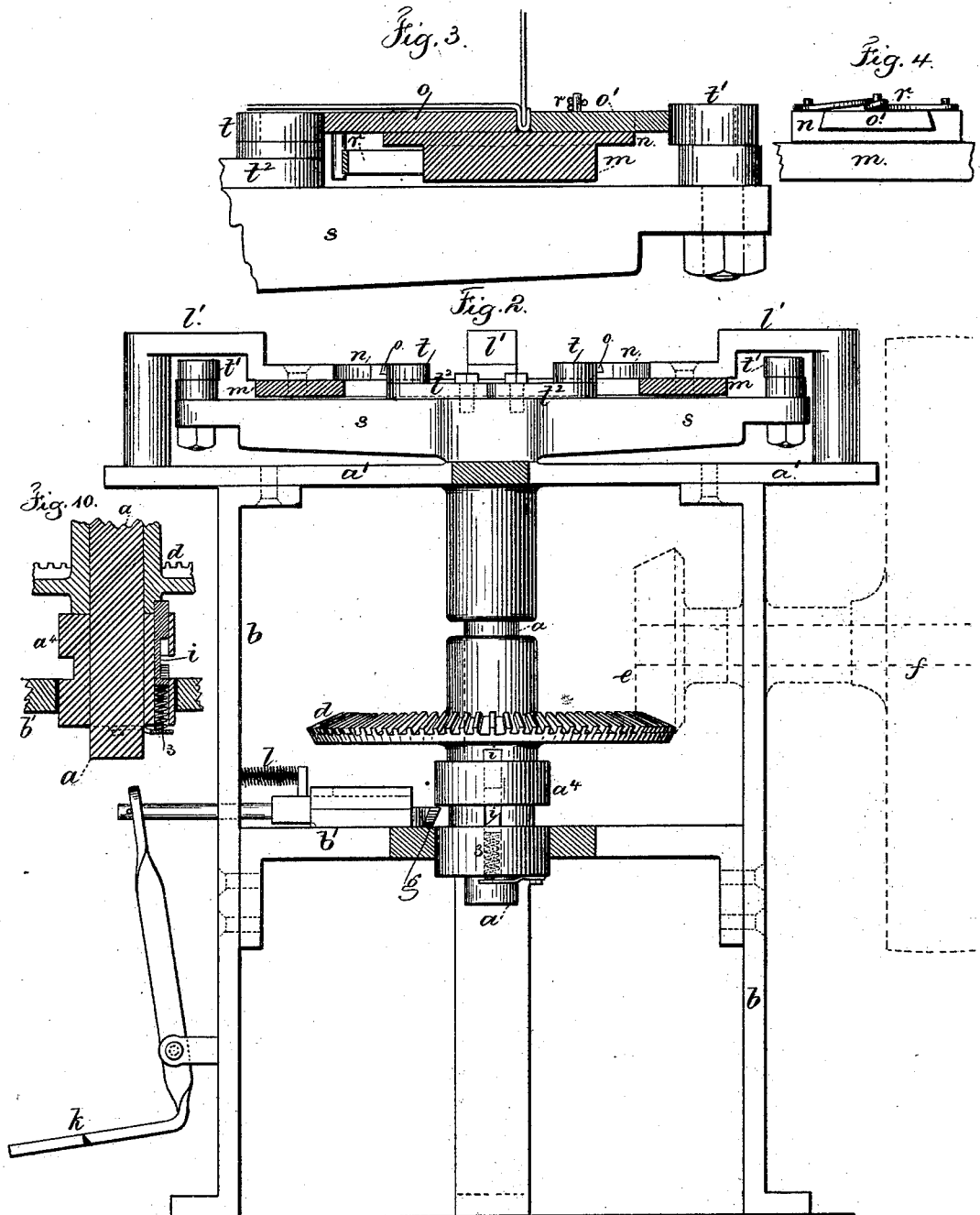
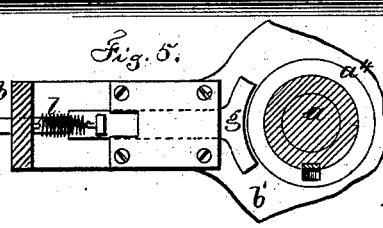
Witnesses
Chas H Smith
Harold Serrell
Inventor
William H. Brock
for Lemuel W. Serrell atty

UNITED STATES PATENT OFFICE.

WILLIAM H. BROCK, OF CORONA, ASSIGNOR TO JABEZ A. BOSTWICK, OF NEW YORK, N. Y.

SHEET-METAL-CAN MACHINERY.

SPECIFICATION forming part of Letters Patent No. 232,111, dated September 14, 1880.

Application filed July 19, 1880. (No model.)

*To all whom it may concern:*

Be it known that I, WILLIAM H. BROCK, of Corona, in the county of Queens and State of New York, have invented an Improvement in Sheet-Metal-Can Machinery, of which the following is a specification.

This machinery is for closing the folded sheet-metal edge of the head and causing it to clamp and hold the edges of the can-body. I make use of a revolving shaft with a cross-head and rollers, that actuate internal and external clamping-dies and press them upon the folded edges of the head to close them firmly upon the ends of the sheet-metal body.

In the drawings, Figure 1 is a plan of said machine. Fig. 2 is an elevation of the shaft and cross-head and section of the frame. Fig. 3 is a section in larger size at the line $x\,x$. Fig. 4 is an end view of one of the outer dies and its ways. Fig. 5 is a plan of the clutch. Fig. 6 is a plan of the can bottom or head. Fig. 7 is a section of a portion of the can. Fig. 8 is a partial plan, illustrating a modification of this machine. Fig. 9 is an end view of one of the outer dies, shown in Fig. 8, and Fig. 10 is a vertical section through the shaft, hubs, and clutch-bolt.

The vertical shaft $a$ is supported in the bed $a'$ and a frame-work, $b$, of any suitable character. I have shown the bed in the form of a cross and the frame as vertical legs, between which is a second cross-frame, $b'$, for the lower end of the shaft $a$.

Around the shaft $a$ is a gear-wheel, $d$, driven by suitable power, such as the bevel-pinion $e$ and shaft $f$, and a clutch or coupling device is used to connect the wheel $d$ to the shaft $a$, or to disconnect it therefrom to stop the machine.

I have shown a bolt, $i$, that is within a mortise in the hub $a^4$, and is thrown up into a recess in the hub of the wheel $d$ by a spring, 3, and the said bolt is notched in its side, so that when the incline at the end of the sliding fork $g$ is brought into the path of the bolt said incline will enter the notch of the bolt and force it down and unlatch the said bolt and stop the shaft. This sliding fork $g$ is under the control of the attendant through the treadle $k$ and spring $l$.

From the top of the bed $b$ there are bracket-pieces $l'$, that rise above the bed and then extend inwardly and downwardly, as in Fig. 2, and support the ring $m$ and the parts carried thereby.

The ring $m$ has upon it fixed ways $n$ for the sliding dies $o$ $o'$, and there are four pairs of dies adapted to operating upon the four rounding corners of the can head or bottom. Hence the ends of the inner dies, $o$, will be convex, and the inner ends of the outer dies, $o'$, will be concave. Each die is allowed a small amount of movement, and the springs $r\,r$ serve to open the dies and cause them to assume a normal position after having been closed. These dies are located so that when open they will receive between them the rounded corners of the otherwise square head or bottom of the sheet-metal can shown in Fig. 6, and it is to be borne in mind that the head or bottom is folded all around its edge with a U-shaped flange and groove, into which is placed the end of the sheet-metal body of the can. These parts are made by dies in the manner well known to tin-can makers, and the attendant places one of the heads stamped up, as aforesaid, upon the dies $o$ $o'$, with the folded rim between the dies $o$ and $o'$, and with the lower end of the can-body in the U-shaped fold, and starts the machine, and the said dies $o$ and $o'$ are closed in pairs successively by the revolving of the aforesaid shaft $a$. Upon this shaft $a$ there is a cross-head, $s$, with four rollers, $t\,t$ and $t'\,t'$, upon vertical studs. The rollers $t\,t$ act upon the inner ends of the slides $o\,o$, and the rollers $t'\,t'$ act upon the outer ends of the slides $o'\,o'$ to force them inwardly. These rollers act upon opposite pairs of the slides $o\,o'$, so as to compress the U-shaped folds of the metal at opposite corners simultaneously, and as the movements are comparatively small the ends of the slides against which the rollers act only require to be rounded.

The rollers $t\,t$ and $t'\,t'$ should be adjustable. For this purpose the studs or gudgeons for the rollers $t$ are upon stocks $t^2$, bolted to the cross-head $s$, the stocks being slotted for the bolts to pass through, and pieces of sheet-tin are introduced at 13, between the inner ends of the stocks, so as to hold them apart under the strain to which they are subjected. The gudgeons for the rollers $t'\ t'$ should be slightly eccentric to the portions of those gudgeons which enter into the cross-head, so that by revolving the gudgeon in the cross-head and then clamping it securely the rollers may be adjusted with the greatest accuracy.

By this construction the curved corners of the can may be closed by the shaft being turned one-half of a revolution, but a complete revolution may be used; and I remark that the dies may be extended more or less in width, so as to act upon portions of the straight edges of the head, as seen in Fig. 8, where the width of the dies $o\ o'$ is such as to act upon half the side of the head, as well as upon the curved corners. When the dies are made in this manner it will not be necessary to employ other means for closing the folded edges of the head; but when only the rounded corners are closed, as by the dies shown in Fig. 1, then the straight portions will have to be closed by ordinary tinmen's tools.

I claim as my invention—

1. The combination, with the pairs of dies $o\ o'$ and their supporting-ways, of the revolving shaft $a$, cross-head $s$, and rollers $t\ t\ t'\ t'$, substantially as set forth.

2. The combination, in a sheet-metal-closing machine, of the dies $o$, having convex surfaces, the dies $o'$, having concave surfaces, the ring or support $m$ for the same, the cross-head $s$, and rollers $t\ t\ t'\ t'$, the shaft $a$, and actuating mechanism, substantially as set forth, whereby the dies are closed in pairs at opposite angles, substantially as specified.

3. The dies $o\ o'$ and the frame or ring $m$ upon which they are supported, in combination with the brackets $l'$, supporting the ring, the cross-head, and the rollers that actuate the dies, the brackets rising above the path described by the rollers, substantially as set forth.

4. The combination, in the sheet-metal-closing machine, of the driving-wheel $d$, the shaft $a$, the mechanism actuated by the shaft for closing the folded seam, the cross-frame $b'$, for supporting the lower part of the shaft, the sliding coupling-bolt $i$, and the disconnecting-fork $g$ and actuating-treadle $k$, substantially as set forth.

Signed by me this 14th day of July, A. D. 1880.

WILLIAM H. BROCK.

Witnesses:
GEO. T. PINCKNEY,
CHAS. H. SMITH.